3,098,328
GRINDING MACHINE
Roger H. Fournier, Millbury, Mass., assignor to Norton Company, Worcester, Mass., a corporation of Massachusetts
Filed Dec. 18, 1961, Ser. No. 159,896
6 Claims. (Cl. 51—165)

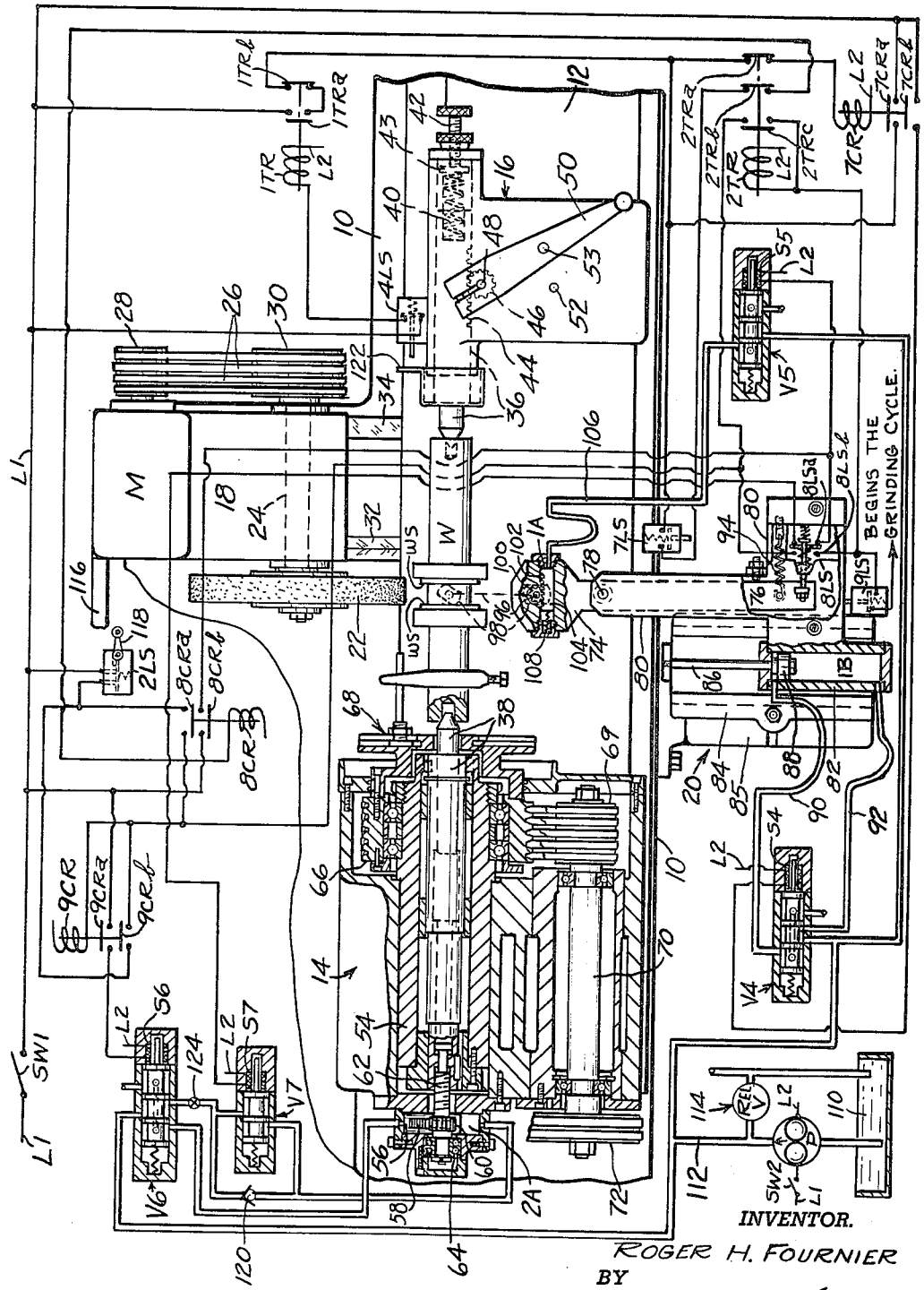

This invention relates to grinding machines and more especially to machines for grinding a work piece having axially spaced, opposed radial surfaces, and to mechanism for automatically positioning the work piece and grinding wheel in such relative relation to each other that the wheel will remove substantially the same amount of material from each surface as it is advanced between them, notwithstanding small variations in the spacing between the opposed surfaces on different work pieces.

Heretofore various mechanisms have been employed for locating a work piece and wheel in alignment, the design of which depended to a considerable extent upon the nature of the support and the operation to be performed. In the patents granted to Fred, 2,693,061, dated November 2, 1954, and Alvord, 2,723,504, dated November 15, 1955, both characterized by grinding apparatus including work piece supporting means consisting of a spaced pair of pot chucks arranged to accommodate limited axial displacement of a work piece, a double-acting probe aligned with the grinding wheel is supported for movement into engagement with the work piece and has at its ends symmetrically disposed cam lobes operable, by rotation into engagement with the spaced surfaces to be ground before the work piece is clamped in the pot chucks, to shift the work axially into alignment with the wheel. In the patents granted to Fred, 2,955,391, dated October 11, 1960, Rocks et al., 2,313,482, dated March 9, 1943, and Flygare et al., 2,264,160, dated November 25, 1941, all characterized by grinding apparatus including work piece supporting means consisting of a pair of opposed centers between which a work piece is secured for the grinding operation, a single-acting probe is supported for movement to a position adjacent a surface to be ground, whereupon power-operable means is actuated to move one or both of the work-supporting centers axially from an initial retracted position until the reference surface is brought into the desired position relative to the probe with the work piece disposed in the proper axial alignment with the wheel.

It is the principal object of this invention to combine the advantageous features of the double-acting probe, referred to above, with power-operable means for shifting the work support in such a way as to effect positioning of the wheel and work accurately and rapidly so as to insure removal of the same amounts of material from each of the surfaces at the same time, by means of mechanism which can be employed with existing grinding apparatus without extensive modification thereof.

As herein illustrated, the positioning mechanism comprises a probe pivotally supported for angular displacement about a vertical axis, and for movement from a retracted position into a position adjacent the work piece and projecting between the opposed surfaces to be ground. The vertical axis about which the probe rotates is preferably disposed substantially coincident with the medial plane of the grinding wheel as illustrated in the accompanying drawing. The probe supports a cam for rotation about an axis parallel to the pivotal axis of the probe, which has lobes disposed symmetrically with respect to its axis operable, by engagement with the spaced surfaces to be ground, to effect displacement of the probe about its pivot in proportion to the magnitude of the misalignment of the work and wheel, and there is means operable, by the displacement of the probe, to initiate operation of power-operable means which effects axial movement of the work-supporting assembly relative to the wheel, to bring the wheel and the work into the desired alignment. With the cam supported by the probe rotated into engagement with the spaced surfaces to be ground, this axial movement of the work supporting assembly produces rotation of the probe about its pivotal support until the displacement of the probe in this manner is effective to terminate the axial movement of the work supporting assembly, the probe is retracted and this retraction initiates movement of the wheel into grinding engagement with the work piece.

While the apparatus described herein is particularly suited to applications in which the same amount of material is to be removed from each of the opposed radial surfaces to be ground, it will be evident from consideration of the following description that the control system actuated by the probe can alternatively be adjusted to terminate the axial movement of the work supporting assembly so that different amounts of material will be removed from the respective radial surfaces to be ground.

The invention will now be described in greater detail with reference to the accompanying drawing showing in plan view the component parts of a grinding machine and illustrating diagrammatically the electric and hydraulic means for effecting the desired alignment of the work with the wheel automatically.

Referring to the drawing, there is a base 10 which supports a table 12 on which there is mounted a work-supporting assembly comprising a head stock 14 and a foot stock 16 respectively supporting the head stock center 38 and the foot stock center 36. A wheel slide 18 is mounted on the base 10 at one side of the work-supporting assembly, and positioning mechanism 20 is mounted on base 10 at the other side of the work-supporting assembly.

The wheel slide 18 supports a wheel 22 for rotation about a horizontal axis on one end of a spindle 24 journalled on the slide, and a motor M. The spindle 24 is driven by belts 26 entrained about pulleys 28 and 30 fixed to the motor shaft and the wheel spindle 24 respectively. The wheel slide, as is conventional in this type of machine, is slidable to and from the work-supporting assembly on V-shaped and flat ways 32 and 34 and is provided with a suitable feeding mechanism for effecting its movement, such as shown in the patent to Silven et al., 2,522,485, dated September 12, 1950, to which reference may be had for the specific details.

The work-supporting assembly, as herein illustrated, comprises a foot stock spindle 36 supported in alignment with a head stock spindle 38 on an axis parallel to the axis of the wheel spindle 24, each including a work center for engagement with one end of a work piece to be supported therebetween. The foot stock spindle 36 is axially movable in the foot stock 16, being urged forwardly therein, that is, toward the end of the work piece to be supported thereby, by means of a strong coiled spring 40 disposed within the foot stock at the rear end of the spindle. The force exerted by the spring 40 on the foot stock spindle may be adjusted by means of a screw 42 threaded through the rear end of the foot stock 16 and supporting an abutment plate 43 in engagement with the spring. The foot stock spindle 36 has along its lower side a toothed portion 44 constituting a rack with which a pinion 46 is engaged. The pinion 46 is fixed to a shaft 48 journalled in the foot stock 16 which, in turn, has fixed to it a handle 50, by means of which the foot stock spindle may be retracted in opposition to the force of the spring 40, to permit removal of the work. A latch element 52 interengageable with a depression or hole 53 in the handle provides for holding the handle in the position in which the spindle is retracted.

The head stock spindle 38 is supported for axial movement in a longitudinally fixed bearing sleeve 54 mounted in the head stock 14. At the rear end of the head stock, adjacent the rear end of the head stock spindle, there is a cylinder 2A which contains a piston 56 on which there is a rack 58 which meshes with a pinion 60. The pinion 60 is fixed to a screw 62. The screw is supported at its rear for rotation in a bearing assembly 64 which constrains it against endwise movement and is threaded at its forward end into the rear end of the head stock spindle 38. By rotating the screw 62 the head stock spindle 38 may thus be moved axially within the head stock and thence relative to the foot stock.

A multi-sheave pulley 66 is rotatably mounted on the sleeve 54 and has fastened to its right end face a conventional driving chuck assembly 68 concentric with the head stock spindle, by means of which rotation of the work supported between the spindles is effected through a driving dog fastened to the work piece. Rotation of the pulley 66 is effected by belts entrained about the pulley 66 and a multi-sheave pulley 69 fixed to one end of a shaft 70 journalled in the head stock. The shaft 70 is driven by a multi-sheave pulley 72 fixed to its opposite end. Structure of this kind is conventional in the art and needs no further explanation.

A work piece $w$, illustrative of that which is to be operated upon and for which the work-locating mechanism 20 is particularly designed, is shown supported between the foot stock and head stock spindles 36 and 38 and as having axially spaced, radial surfaces $ws$—$ws$, from which it is desirable to remove equal amounts of material by plunging the rotating grinding wheel 22 therebetween. It is to be understood that the positioning mechanism, as will now be described, will be effective for grinding axially spaced, opposed surfaces whether they be perpendicular to the axis of the work or inclined thereto and whether they are plane or stepped, so long as the wheel 22 is suitably shaped in cross section.

The positioning mechanism 20 comprises a probe head 74 at the forward end of a probe arm 76. The probe arm 76 is pivotally supported on a slide 80, by means of a pin 78, for angular displacement about a vertical axis which may conveniently be in a plane coinciding with the medial plane of the grinding wheel 22 at the opposite side of the work from the grinding wheel. The slide 80 is movable toward and away from the work piece and, to this end, is mounted on the wall of a cylinder 82 slidable back and forth on a guide support 84 adjustably fixed to a bracket 85 fixed to the base 10. A piston rod 86 fixed at one end to the support 84, parallel to the slide 80, extends through one end of the cylinder and has fastened to it a piston 88. Flexible conductors 90 and 92 provide for supplying fluid to the opposite ends of the cylinder so as to move the cylinder relative to the piston.

A switch 8LS is mounted on the slide 80 near the end of the probe arm 76 most remote from the work piece and a spring 94, connected at one end to the probe arm 76 and at its other end to the support 80, holds the probe arm 76 engaged with the switch 8LS, so that its contacts 8LS$b$ are open and its contacts 8LS$a$ are closed.

The probe head 74 contains a vertically disposed opening in which is rotatably journalled a shaft 96, to the lower end of which is fixed a cam 98 (shown in dotted lines in its operative position on the center line of the work), having spaced parallel, vertical side walls and curved end walls which are symmetrical with respect to the axis of rotation of the shaft. The cam 98 corresponds substantially in shape to that shown in the Fred patent, 2,693,061, referred to above. The portion of the shaft 96 journalled in the probe has fixed to it a pinion 100 which meshes with a rack 102 on a piston 104 disposed crosswise of the probe head within a cylinder chamber 1A. A flexible conductor 106 provides for supplying fluid to one end of the cylinder so as to move the piston therein against a spring 108 at the other end of the cylinder. Movement of the piston will effect rotation of the shaft 96 and hence of the cam 98 clockwise as seen in the drawing.

In order to locate the work $w$ in the proper axial position relative to the grinding wheel, after the work piece has been placed between the centers of the head stock and foot stock spindles with the head stock spindle 38 in its initial retracted position, the probe arm 76 is moved toward the work piece and stopped in a position in which the cam 98 is disposed in vertical alignment with the center line of the work piece. At this position, the cam 98 is situated between the surfaces $ws$—$ws$ of the work piece to be operated on with its parallel side walls substantially parallel to the opposed surfaces $ws$—$ws$. The cam 98 is next rotated in the manner described further below until its opposed cam lobes respectively engage the opposed surfaces $ws$—$ws$ to be ground. Such rotation of the cam 98 with the work piece axially misaligned relative to the grinding wheel will displace the probe arm 76 about the supporting pin 78 in a direction corresponding to the sense of the misalignment of the work piece and by an amount proportional to the misalignment of the work piece.

It will be noted that the switch 8LS controlled by angular displacement of the probe arm 76 illustrated schematically in the drawing includes a spring biased lost motion element so that the initial angular displacement of the probe arm 76 about the supporting pin 78 produced during rotation of the cam 98 into engagement with the opposed surfaces $ws$—$ws$ will not trigger the switch 8LS prematurely, before the head stock spindle 38 is displaced from its initial retracted position in the manner described further below to shift the work piece into proper axial alignment with the grinding wheel. The lost motion element is engaged by a triggering element secured to the probe arm 76 by suitable adjustable attachment means such as a threaded lug and a locknut as illustrated in the drawing.

With the cam 98 maintained in engagement with both the opposed surfaces $ws$—$ws$ of the work $w$, the axial displacement of the head stock spindle 38 to the right as seen in the drawing produces coordinated clockwise angular displacement of the probe head 74 and probe arm 76 about the supporting pin 78 indicative of the instantaneous position of the work piece during the limited travel of the head stock spindle 38 necessary to bring the work $w$ into proper axial alignment with the grinding wheel. The adjustable element of the limit switch 8LS is set so that this limit switch is actuated by the probe arm 76 to terminate the axial movement of the head stock spindle 38 when the work $w$ is disposed in the proper axial position relative to the grinding wheel, after which the probe head 74 is retracted from the work $w$ to the position shown in the drawing to close limit switch 9LS and thereby initiate the grinding cycle during which the grinding wheel is advanced into engagement with the work $w$ to perform the grinding operation.

Referring to the electrical and hydraulic portions of the drawing, electrical power is supplied to the apparatus from a main line L1 through a switch SW[1] and pressure fluid is supplied to the system by a conventional pump P driven by an electric motor not shown, operation of which is initated by closing a switch SW[2], whereby pressure fluid is drawn from a reservoir 110 and supplied to the system through a conductor 112 from which there is a bypass including the relief valve 114, connected to the return side of the system to pass excess fluid back to the reservoir, thereby protecting the system against pressures higher than that for which valve 114 is set.

Starting with a work piece $w$ mounted between the spindle centers as shown, the operator first closes the switch SW[2] to start the pump and then closes the switch SW[1] to supply current to the system. Closing the switch SW¹ supplies current through the closed contacts of a limit switch 4LS to the coil of a time-delay relay 1TR. Energizing the coil of the time-delay relay 1TR closes the normally open contacts 1TRa immediately and initiates the timed interval after which the normally closed contacts 1TRb open. The now closed normally open contacts 1TRa supply current to the limit switch 7LS provided with normally open contacts, now open, and to the normally closed time-delay contacts 2TRa of a second time-delay relay 2TR also provided with normally closed contacts 2TRb and normally open contacts 2TRc. Until the normally closed time-delay contacts 2TRa are opened at the end of a predetermined time interval, current is supplied through these contacts to the coil of a relay 7CR.

When the coil of the relay 7CR is energized, it closes two sets of normally open contacts 7CRa and 7CRb. The contacts 7CRa, now closed, establish a circuit to hold the coil of relay 7CR energized and also maintain the supply of current to limit switch 7LS after the time-delay contacts 1TRb of relay 1TR open at time-out. When they are closed, the contacts 7CRb energize the solenoid of the valve V4 moving the valve spool therein toward the left as shown in the drawing to supply pressure fluid of the upper end of the chamber 1B within cylinder 82, thereby to move the probe slide 80 attached to the cylinder 82 toward the work w to position the cam 98 in vertical alignment with the longitudinal axis of the work w and between the surfaces ws—ws to be ground.

As previously described, the end of the probe arm 76 remote from the work w is held by the spring 94 against the switch 8LS with sufficient force to hold the contact 8LSa closed. When the probe reaches its forward position it closes the normally open contacts of the switch 7LS so that current is now supplied through the normally closed contacts 2TRb of the relay 2TR to the coil of a relay 8CR thus closing both of its normally open sets of contacts 8CRa and 8CRb. Closing the contact 8CRb supplies current to a solenoid S5 of a valve V5, shifting the spool therein to the left as shown in the drawing to supply fluid pressure through the conduit 106 to the right end of the cylinder chamber 1A within the probe 74 as seen in the drawing, thereby rotating the pinion and the cam 98 so as to set its camming surfaces against the surfaces ws—ws of the work w, with concurrent limited preliminary angular displacement of the probe head 74 and probe arm 76 about the supporting pin 78 as described above.

Current is supplied through the now closed contacts 8LSa of the switch 8LS to the solenoid S7 of a valve V7, shifting the spool therein to the left to permit fluid to exhaust from the lower end, as seen in the drawing, of cylinder chamber 2A through valve V7. The contact 8CRa also supplies current from the line L1 through the normally closed limit switch 2LS to the coil of a relay 9CR, thereby closing both of its normally open sets of contacts 9CRa and 9CRb. Closing of the contacts 9CRa energizes the solenoid S6 of a valve V6, shifting the spool therein to the left to permit fluid exhausted from cylinder chamber 2A through valve V7 to pass to the return side of the system through valve V6 at a rate controlled by the setting of the throttle valve 124, and to supply fluid pressure to the upper end, as seen in the drawing, of cylinder chamber 2A through valve V6 to cause rotation of the pinion 60 and the screw 62 by displacement of piston 56 so as to move the head stock spindle 38 axially toward the right, as seen in the drawing, with the cam 98 on the probe arm locked between the surfaces ws—ws of the work w. The now closed contact 9CRb provides a holding circuit to hold the solenoid S6 and the coil of the relay 9CR energized through the normally closed contacts of limit switch 2LS and to supply current to the remaining circuits after the relay 8CR is de-energized.

The head stock spindle 38, the work w supported and positioned axially thereby, and the cam 98 locked in engagement with the work w continue to move to the right at a rate controlled by the adjustable throttle valve 124 until the opposed surfaces ws—ws of work w are disposed in the desired axial position relative to the grinding wheel, most commonly symmetrical with respect to the grinding wheel so that equal amounts of stock are removed from the respective surfaces ws—ws of the work w. Since the cam 98 is pivotally connected to the probe head 74, the probe arm 76 is displaced angularly about its supporting pin 78 by this displacement of the cam 98, thereby swinging the probe arm 76 clockwise, as seen in the drawing, until the contacts 8LSa open and the contacts 8LSb close. Opening the contacts 8LSa de-energizes solenoid S7 of the valve V7, allowing the valve spool to move to the right under the spring pressure thereby blocking exhaust of the fluid pressure from the cylinder chamber 2A which stops the movement of the head stock spindle 38 and hence the work w. The above-mentioned holding circuit including the limit switch 2LS and the contacts 9CRb of relay 9CR energizes the coil of the time-delay relay 2TR through the now closed contacts 8LSb, opening the contacts 2TRb, closing the contacts 2TRc and commencing a timing period of predetermined length after which time delay contacts 2TRa are opened.

It will be noted that the adjustable throttle valve 124 permits regulation of the speed at which the head stock spindle 38 moves to the right, and, since throttle valve 124 restricts the flow of fluid from cylinder chamber 2A through valve V6 to the exhaust side of the system while the flow of fluid to cylinder chamber 1A through conduit 106 from valve V5 is unrestricted, the cam 98 will be rotated into engagement with the opposed surfaces ws—ws substantially before the head stock spindle and the work w can be advanced far enough to actuate limit switch 8LS by means of the probe arm 76 displaced by the cam 98.

Closing the contacts 2TRc provides a holding circuit for the coil of the relay 2TR and completes a circuit to a limit switch 9LS. Opening of the contacts 2TRb de-energizes relay 8CR thereby reopening the contacts 8CRa and 8CRb, de-energizing solenoid S5 and allowing the spool in the valve V5 to move to the right under spring pressure. This exhausts pressure fluid from the cylinder chamber 1A under the pressure of spring 108 so as to return the cam 98 to its initial position in which its parallel surfaces clear the opposed work surfaces. De-energization of relay 8CR prevents re-energization of the solenoid S7, preventing further movement of the head stock spindle 38 and hence of the work w. The solenoid S6 is still energized so that pressure is maintained on the upper side of the piston 56 in the cylinder chamber 2A. The probe arm 76 returns to its original position under the influence of the spring 94, actuating the limit switch 8LS to open the contacts 8LSb and close the contacts 8LSa. However, this does not affect any of the circuit because of the holding circuit mentioned above.

Within the predetermined time thereafter the time-delay contacts 2TRa of time-delay relay 2TR open, thereby de-energizing the holding circuit for relay 7CR so that its contacts 7CRa and 7CRb open. Opening of the contact 7CRb de-energizes solenoid S4, allowing the spool in the valve V4 to shift to the right under spring pressure. This vents pressure fluid from the upper end of the cylinder chamber 1B and supplies it to the lower end so as to retract cylinder 82 and the probe arm 76. Retraction of the probe arm 76 opens the contacts of the limit switch 7LS. When the probe arm 76 reaches its retracted position it actuates the limit switch 9LS, closing its contacts to initiate the grinding cycle during which the wheel slide is advanced to move the grinding wheel 22 into engagement with work piece. The means for effecting feeding movement of the slide and retraction thereof is well known and a typical arrangement for this purpose is disclosed in Patent No. 2,522,485, to which reference may be had for details not shown herein.

During the feeding movement of the wheel slide a bracket arm 116 fixed to the slide brushes by the single acting limit switch 2LS provided with a one-way operating arm 118 which does not actuate the switch contacts by clockwise deflection as seen in the drawing. After the grinding cycle is terminated, by means such as that disclosed in Patent No. 2,522,485, the wheel slide retracts, rotating the arm 118 counter-clockwise as seen in the drawing which movement momentarily opens the contacts of the switch 2LS, de-energizing the relay 9CR. This opens the contacts 9CR$a$ and 9CR$b$ which de-energizes the holding circuit for the time-delay relay 2TR, resetting it for the next cycle and also de-energizing solenoid S6, allowing the spool in the valve V6 to shift to the right under the spring pressure. Fluid under pressure is then supplied to the lower end of the cylinder chamber 2A through a check valve 120 to re-set the piston 56 therein and retract the head stock spindle 38. Fluid pressure exhausts from the cylinder chamber 2A through the deactivated valve V6.

The foot stock spindle is now retracted manually by swinging the arm 50 in a clockwise direction and, during such retraction, a finger 122, movable with the foot stock spindle, engages the limit switch 4LS, opening its contacts thereby re-setting the time-delay relay 1TR. Having retracted the foot stock spindle the finished work piece is removed and a new piece inserted while the foot stock spindle is held retracted as by engagement of latch element 52 with hole 53. If desired, the switch SW$^1$ may be opened to permit unloading and loading without maintaining the foot stock spindle 36 retracted to hold limit switch 4LS open. If cycling is not controlled by opening the switch SW$^1$, the cycle will be repeated merely by allowing the foot stock spindle to engage the new work piece which thus closes the contacts of the limit switch 4LS.

It should be understood that the present disclosure is for the purpose of illustration only and that this invention includes all modifications and equivalents falling within the scope of the appended claims.

What is claimed is:

1. In apparatus for machining a work piece having opposed spaced surfaces, including a work-supporting assembly for supporting a work piece for axial movement, and a cutting tool supported for transverse movement into engagement with a work piece; a device for aligning the opposed spaced surfaces axially with respect to the cutting tool preparatory to a machining operation, comprising a cam having symmetrically disposed lobes, said cam being supported for pivotal movement about a first axis and for rotary movement about a second axis spaced therefrom and parallel thereto, means for positioning the cam between the opposed spaced surfaces of a work piece, means for effecting rotation of the cam about the first axis to engage its lobes with both of the opposed spaced surfaces, drive means operable to effect axial movement of the work piece supported in the apparatus and concurrent displacement of the cam engaged therewith relative to the cutting tool, and control means actuated by movement of said cam into a predetermined position relative to the second axis to deactivate said drive means and secure a work piece supported in the apparatus with its opposed spaced surfaces in a predetermined axial position relative to the cutting tool.

2. In apparatus for grinding a work piece having opposed spaced surfaces, including a work-supporting assembly arranged to support a work piece for rotation about a predetermined axis and for axial movement, and a grinding wheel supported for movement transversely of and into engagement with a work piece, a device for aligning the opposed spaced surfaces of a work piece to be ground relative to the side surfaces of the grinding wheel preparatory to grinding, comprising a movably mounted probe means, a camming element with opposed cam lobes movably mounted upon said probe means, means for supporting said probe means with said camming element disposed between the opposed spaced surfaces of a work piece, means for displacing said camming element relative to said probe means to engage the opposed cam lobes with the respective opposed spaced surfaces, drive means operable to produce axial movement of a work piece supported in the apparatus and concurrent displacement of the cam element engaged with such a work piece relative to the grinding wheel to effect responsive movement of the probe means, and control means actuated by the movement of said probe means into a predetermined position to deactivate said drive means when a work piece supported in the apparatus is positioned with its opposed spaced surfaces in a predetermined axial position relative to the grinding wheel.

3. The combination with apparatus for grinding a work piece having opposed spaced surfaces including a work supporting assembly arranged to support a work piece for rotation about a predetermined axis and for movement along its axis of rotation, and a grinding wheel rotatably mounted on an axis parallel to the axis of rotation of a work piece and supported for movement transversely of and into engagement with a work piece; of a device for aligning the opposed spaced surfaces of a work piece lengthwise of its axis of rotation with respect to the grinding wheel prior to a grinding operation, comprising an elongated probe pivotally supported upon the apparatus for displacement about a first pivotal axis intermediate the ends of the probe, a cam having opposed cam lobes pivotally supported upon one end of said probe for displacement about a second pivotal axis relative to said probe, cam rotating means operable to rotate said cam relative to said probe to engage the opposed cam lobes with the opposed spaced surfaces of a work piece, work piece displacement means operable to produce lengthwise movement of a work piece, said cam rotating means and said work piece displacement means being actuated simultaneously and operable sequentially first to rotate both cam lobes of said cam into engagement with a work piece and then to move a work piece lengthwise thereof into a predetermined position relative to the grinding wheel, and control means actuated by movement of said probe with said cam about the second pivotal axis into a predetermined position relative to the second pivotal axis to deactivate said work piece displacement means when a work piece is disposed in the predetermined position relative to the grinding wheel.

4. The combination described in claim 3, and, in addition, means actuated by said control means operable to secure a work piece in the desired predetermined position relative to the grinding wheel for a grinding operation.

5. The combination described in claim 3, and, in addition, probe supporting means movable transversely of a work piece, positioning means for said probe supporting means operable in one direction to position said cam between the opposed spaced surfaces of a work piece when a work piece is mounted in the work supporting assembly and operable in the opposite direction to retract said probe supporting means when said control means is actuated by said probe, and means operable when said probe supporting means is fully retracted to initiate movement of the grinding wheel toward a work piece.

6. The combination with an apparatus for grinding a work piece having opposed spaced surfaces, comprising a work-supporting assembly including head and foot stock spindles arranged coaxially to support a work piece therebetween for rotation about an axis passing through the spindles, said spindles being axially movable to shift a work piece lengthwise of its axis of rotation, and a grinding wheel supported on a wheel slide for rotation about an axis parallel to that of the spindles and for movement from a retracted position into engagement with a work piece for grinding; of a work and wheel aligning device for establishing a symmetrical relationship lengthwise of the axis of rotation between the grinding wheel and the opposed spaced surfaces to be ground, comprising a probe supported for displacement about a first pivotal axis and for movement transversely of the work piece between retracted and operative positions, a cam supported by the probe about a second pivotal axis parallel to said first pivotal axis between retracted and operative positions, said cam having cam lobes disposed symmetrically relative to said second pivotal axis, means operable when a work piece is secured between the head stock and foot stock spindles to move said probe from its retracted position to its operative position, means operative when said probe reaches its operative position to rotate said cam from its retracted position to its operative position in which the respective cam lobes are engaged with the opposed spaced surfaces of a work piece to secure the end of the probe supporting said cam in fixed axial relation to a work piece so engaged, means operable when said cam is engaged with a work piece to advance the head stock spindle, a work piece supported thereby, and said cam lengthwise of the axis of rotation of a work piece from an initial retracted position toward the position in which the opposed spaced surfaces of a work piece are disposed symmetrically relative to the grinding wheel, control means actuated by movement of said probe about said first pivotal axis into a predetermined angular position relative to said first pivotal axis operable to terminate the advance of the head stock spindle to secure a work piece in fixed axial relation to the grinding wheel, to return said cam to its retracted position, and to return said probe to its retracted position, means operable when said probe is returned to its retracted position to initiate a grinding cycle, and means operable when a grinding cycle is completed to return the head stock spindle to its initial retracted position.

References Cited in the file of this patent
UNITED STATES PATENTS

| | | |
|---|---|---|
| 2,264,160 | Flygare et al. | Nov. 25, 1941 |
| 2,693,062 | Silven et al. | Nov. 2, 1954 |
| 2,955,391 | Fred | Oct. 11, 1960 |